Jan. 13, 1970 K. GERULL 3,489,742
METHOD OF PRODUCING CELLULOSE
Filed May 2, 1967
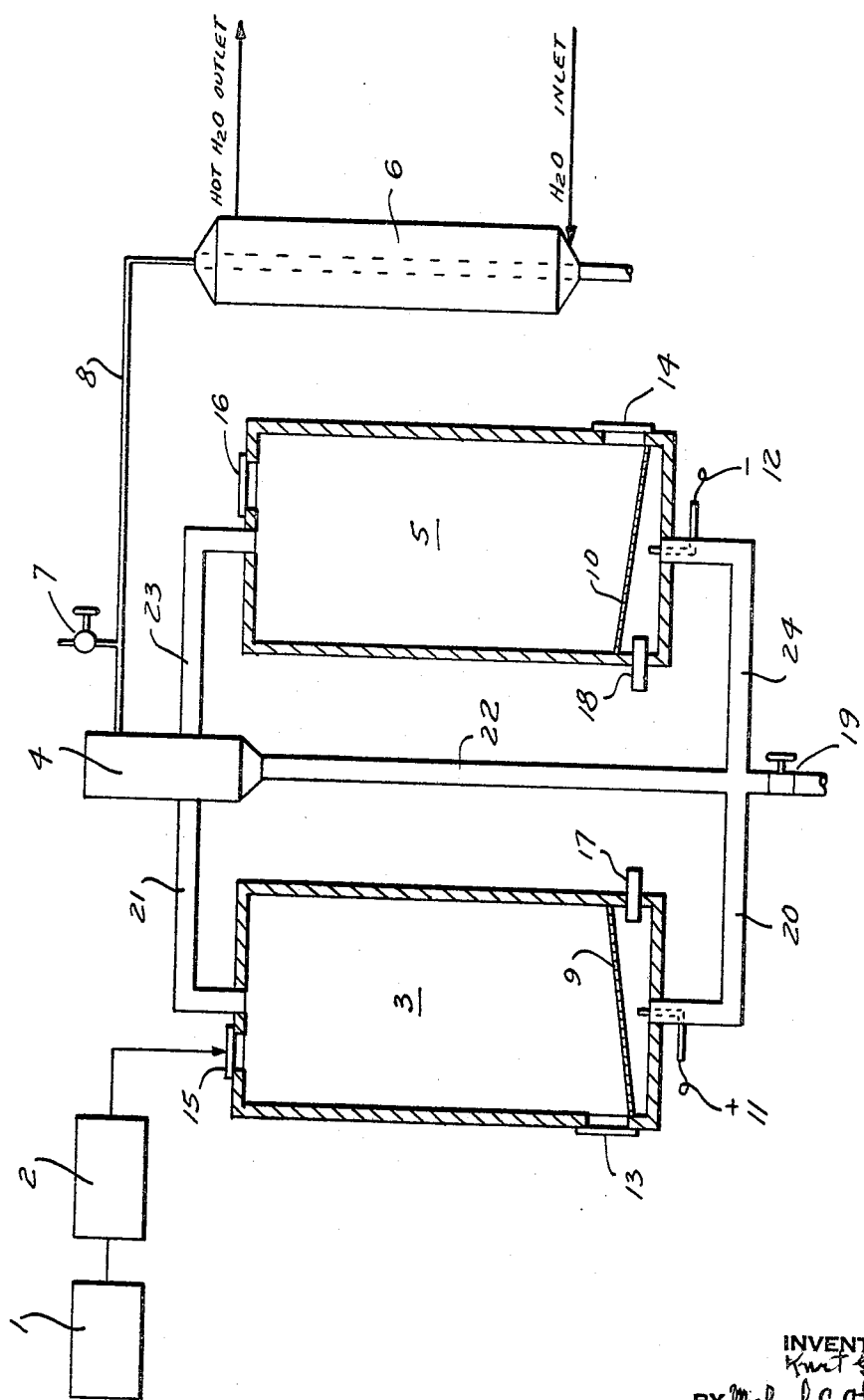
INVENTOR:
Kurt Gerull
BY Michael S. Striker
ATTORNEY

3,489,742
METHOD OF PRODUCING CELLULOSE
Kurt Gerull, Port-Au-Prince, Haiti, assignor of one-half to H. Thomasset, Pointe-a-Pitre, Guadeloupe
Filed May 2, 1967, Ser. No. 635,620
Int. Cl. D21c *3/18, 3/02*
U.S. Cl. 260—212         17 Claims

ABSTRACT OF THE DISCLOSURE

Cellulose is produced from cellulose-containing vegetable material by subjecting the vegetable material to digestion, alternatingly with sodium hydroxide and with chlorine gas, whereby the sodium hydroxide and the chlorine gas are produced by electrolytic decomposition of aqueous sodium chloride solution in which the cellulose-containing vegetable material is suspended, and the electrolytic decomposition is carried out in such a manner that a given portion of vegetable material is successively and alternatingly contacted with the thus produced sodium hydroxide and chlorine gas in statu nascendi.

BACKGROUND OF THE INVENTION

The present invention is concerned with producing cellulose from vegetable material containing cellulose, by digesting the non-cellulosic constituents of such vegetable material.

It has been proposed to carry out such process with digesting liquors which may be alkaline liquors and which may contain chlorine or compounds formed of chlorine, in alkaline solutions. However, as well known in the art, the various processes for separating cellulose from vegetable material containing the same are rather cumbersome, requiring strict control and substantial equipment and, generally, there is a need for a method of producing cellulose which can be carried out in a very simple and effective manner. It is an object of the present invention to provide a method of producing cellulose by digesting the non-cellulosic constituents of cellulose-containing vegetable material which can be carried out in an extremely simple and highly economical manner.

SUMMARY OF THE INVENTION

According to the present invention, cellulose is obtained from cellulose-containing vegetable raw material in a particularly simple and economical manner by introducing the vegetable material and an aqueous sodium chloride solution, preferably of a strength of about 10% and free of magnesium and calcium salts, into two communicating retorts. The two retorts are subjected to an electric potential so that in the communicating retorts electrolytic decomposition of the sodium chloride solution will take place, causing in one of the retorts the formation of sodium hydroxide and in the other of the retorts the formation of chlorine gas. After a given time, the potential is reversed so that in the retort in which previously sodium hydroxide was produced now chlorine gas will be produced, and in the retort in which previously chlorine gas was produced, now sodium hydroxide will be produced.

Such a reversal of the potential is repeated as often as desired.

In this manner, the vegetable material, in various stages of digestion, is alternately contacted with sodium hydroxide and chlorine gas in statu nascendi and this will result in very effective separation of the cellulosic material from the non-cellulosic constituents such as ligneous matter of the vegetable material, the ligneous matter becoming incorporated in the aqueous solution.

It is then a simple matter to separate from the withdrawn contents of the respective retort the cellulosic material and, if desired, to recover ligneous matter from the spent aqueous solution by sedimentation.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

The single figure of the drawing is a schematic elevational illustration of a device for carrying out the process of the present invention.

DESCRIPTION OF THE PREFERRED EMBODIMENTS

According to the present invention, cellulose-containing vegetable material which may be of any available origin, including wood, but preferably will be of the type of material represented for instance by sisal, for instance, *Agave rigida, Agave rigida sisalana, Furcraea hexapetala, Furcraea tuberosa, Furcraea gigantea* and *Saccarum officinarum* L., is subjected to digestion so as to separate the cellulose fibers of the vegetable material from the other constituents thereof, the latter at least partly being dissolved.

Digestion is carried out in a solution of alkali metal chloride, and for practical purposes this will be sodium chloride. The sodium chloride solution preferably will be an aqueous solution containing about 10% sodium chloride.

By electrolytic decomposition, chlorine gas and sodium hydroxide are formed of the sodium chloride solution at spaced points of the apparatus and by reversal of the polarity, the portion of the apparatus where first sodium hydroxide has been formed will then be used for the introduction of chlorine gas, and vice versa.

The sodium chloride solution should be free of calcium and magnesium salts since the latter would precipitate and would be difficult to separate from the cellulose fibers.

Since commercial or technical sodium chloride solutions frequently contain calcium or magnesium, it is preferred, according to the present invention, to treat the crude 10% aqueous sodium chloride solution first with sodium carbonate and bicarbonate in amounts just sufficient to precipitate the calcium and magnesium salts, to separate the precipitated salts and to use the thus purified solution for the purpose of the present invention.

Separation of the precipitated calcium and magnesium salts is preferably carried out first by sedimentation and then by filtration of the supernatant but still somewhat cloudy liquor.

It is preferred to carry out the process of the present invention, i.e., the digestion of the cellulose fibers-containing vegetable material at an elevated temperature of between about 212° and 300° F. and preferably at about 250° F.

As is well known, upon passage of current through the electrolyte solution, sodium chloride will be separated into sodium and chlorine ions and the sodium ions will combine with water to form sodium hydroxide and hydrogen gas, whereas the chlorine ions will form chlorine gas.

By reversing the polarity of the electrodes which are introduced into separate but communicating portions of the apparatus, as will be described in more detail below, the vegetable material in each of the two separate portions of the apparatus will be alternatingly exposed to sodium hydroxide and chlorine gas in statu nascendi.

To liberate at the respective electrodes one gram-equivalent of sodium hydroxide or chlorine gas, one Faraday or 96,850 coulombs are required. Since one ampere hour equals 3600 coulombs, one ampere hour will liberate 1.3218 grams chlorine and 1.4913 grams sodium hydroxide.

The vegetable material may be comminuted in per se conventional manner prior to being introduced into the digestion apparatus.

Since the two retort or digester portions of the apparatus contain equal amounts of 10% sodium chloride solution, the relative concentrations will be automatically maintained in accordance with the stoichiometric weights corresponding to the formula:

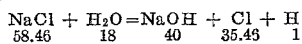

$$NaCl + H_2O = NaOH + Cl + H$$
$$58.46 \quad 18 \quad\quad 40 \quad\quad 35.46 \;\; 1$$

Assuming the cost of one kw. as being 1.5¢, the production of bleached sisal cellulose per tone (2000 pounds) would be about $20.

The current efficiency, or particularly the cathodic current efficiency of the process varies between about 90 and 96%.

In other words, about 90–96% of the amount of caustic soda which theoretically should be formed by the electrolytic process is actually made available.

Preferably, reversal of polarity of the electrodes is carried out about once every hour so that the vegetable material in the sodium chloride solution is alternatingly exposed for periods of one hour each to sodium hydroxide in statu nascendi and chlorine gas in statu nascendi.

Referring now to the drawing, which shows schematically an arrangement which may be used for producing cellulose from any cellulose-containing vegetable material, but with particular reference to using sisal as raw material, it will be seen that the raw material is introduced first into a leaf cutter 1 wherein the material is comminuted to pieces of about 2 inches.

The thus cut material is then passed through a multi-roller leaf crusher 2, and from there introduced through opening 15 into retort 3 which is provided with an acid- and chlorine-proof lining.

Gas formed in retort 3 during production of sodium hydroxide and hydrogen gas therein, i.e., a mixture of steam, hydrogen gas and possibly relatively small amounts of HClO are withdrawn through the conduit leading to gas receiver 4.

A retort similar to 3 and indicated by reference numeral 5 is similarly connected to gas receiver 4 and formed with an opening 16, also for the introduction of cut and crushed vegetable material from crusher 2.

From gas receiver 4, a stainless steel conduit 8 leads to condensor 6. A hydrogen gas outlet valve 7 communicates with conduit 8 and serves for withdrawing the relatively light hydrogen gas therefrom.

Conduit 8, for instance, may be a stainless steel pipe having an inner diameter of ½ inch.

The retorts 3 and 5, respectively, are provided with false perforated bottoms 9 and 10.

Steam inlets 17 and 18, respectively, serve to introduce live steam into the retorts in order to maintain the desired temperature therein. As indicated further above, the temperature may be up to about 300° F. and, in such case, a pressure above atmospheric pressure may be maintained in the apparatus in per se conventional manner.

Terminals 11 and 12 serve for passing electric current through retorts 3 and 5 which communicate with each other by means of pipes 20, 21, 22, 23 and 24. Terminals 11 and 12 are connected to a source of electric current and, in a manner not shown, the polarity of the terminals may be reversed. As indicated, the positive terminal is in contact with the sodium chloride solution in retort 3, below inclined perforated false bottom 9 and, in a similar manner, terminal 12 is in contact with the sodium chloride solution in retort 5.

Thus, as arranged, sodium hydroxide will be produced in one of the two retorts and chlorine gas in the other. Upon the reversal of the polarity of the terminals, there will also be reversal with respect to the retorts in which sodium hydroxide or chlorine gas are produced.

After digestion has been completed which may take various periods of time depending on the type of raw material and the temperature, the digested material is withdrawn through openings 13 and 14.

The withdrawn material may then be separated into the thus produced cellulose and spent liquor and by settling ligneous substances may be separated from the spent liquor.

The gases and vapors which are collected in collector 4 and pass from there through conduit 8, with the exception of the hydrogen gas which is withdrawn at 7, will pass through a preferably water-cooled condenser 6 and the thus-condensed vapors may be then used or disposed of in any desired manner.

Furthermore, cellulose free liquid may be withdrawn through drain 19 since the cellulose will not penetrate through false bottoms 9 and 10.

The following example are given as illustrative only, without limiting the invention to the specific details of the example.

EXAMPLE

Sisal leaves are cut at 1 to a size of between 2 and 2½ inches, then passed through the multi-roller crusher and introduced into the retorts. Both retorts are now filled with equal amounts by weight of crushed sisal and 10% pure aqueous sodium chloride solution.

The length of time of cooking depends on the character and type of the used raw material, and on the temperature maintained during the process.

In the case of Haitian sisal, the cooking time will be between about 3 and 6 hours at a temperature of about 250° F.

However, it is generally desirable to switch off the electric current after about 3 hours and to take samples from both retorts in order to determine the extent to which digestion of the vegetable material has been completed.

Special openings may be provided for taking samples from the retorts in a manner known per se.

During the cooking process, i.e., during between 3 to 6 hours in the case of Haitian sisal, the direction of flow of current is reversed once every hour.

After a sample taken from the retorts shows that the cellulose is of the desired purity, the electric current is shut off, the caustic solution now found in both retorts is pumped into open storage tanks, for instance by being withdrawn through outlet 19, and allowed to stay there until at least a major portion of the ligneous matter suspended therein has settled. Thereafter, the caustic solution can be easily separated from the ligneous matter and the latter used for instance as fertilizer.

The moist cellulose is then withdrawn through openings 13 and 14 and, after washing and drying, constitutes a marketable product.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of producing cellulose by digesting non-cellulosic constituents of a cellulose-containing vegetable material, which method comprises alternatingly contacting said vegetable material with alkali metal hydroxide and chlorine in the absence of calcium and magnesium salts.

2. A method as defined in claim 1, wherein said alternating contacting is carried out so as to at least twice contact said vegetable material with sodium hydroxide.

3. A method as defined in claim 1, wherein said alternating contacting is carried out so as to at least twice contact said vegetable material with chlorine.

4. A method as defined in claim 1, wherein said vegetable material is repeatedly alternatingly contacted with sodium hydroxide and chlorine.

5. A method as defined in claim 1, wherein said sodium hydroxide and said chlorine are in statu nascendi.

6. A method as defined in claim 1, wherein said alkali metal is sodium, said vegetable material and aqueous sodium chloride solution are introduced into two communicating retorts, said retorts respectively being connected to terminals of opposite polarity of a source of electric current so as to cause in said retorts electrolytic decomposition of said aqueous sodium chloride solution, thereby forming in one of said retorts sodium hydroxide and in the other of said retorts chlorine gas, said sodium hydroxide and said chlorine gas causing digestion of the vegetable material in the respective retorts; and wherein at least once the polarity of said terminals is reversed so as to form chlorine gas in said one retort and sodium hydroxide in said other retort.

7. A method as defined in claim 6, wherein said sodium chloride solution is free of calcium and magnesium salts.

8. A method as defined in claim 7 and comprising the step of pretreating an aqueous magnesium- or calcium-containing sodium chloride solution so as to precipitate and separate calcium and magnesium salts therefrom.

9. A method as defined in claim 8, wherein said pretreating is carried out with sodium carbonate and sodium bicarbonate in amounts just sufficient to precipitate the entire magnesium and calcium content of the initial sodium chloride solution.

10. A method as defined in claim 7, wherein said solution is an about 10% aqueous solution of sodium chloride.

11. A method as defined in claim 10, wherein the contents of said retorts are maintained during said electrolytic decomposition of a temperature of about 250° F.

12. A method as defined in claim 7, wherein said vegetable material is selected from the group consisting of *Agave rigida, Agave rigida sisalana, Furcraea hexapetala, Furcraea tuberosa, Furcraea gigantea* and *Saccarum officinarum L.*

13. A method as defined in claim 12, wherein said vegetable material is sisal.

14. A method as defined in claim 7, wherein said vegetable material is comminuted prior to introduction into said retorts.

15. A method as defined in claim 7, and including the steps of separating, after completion of digestion, the contents of said retorts into cellulosic material and spent caustic solution.

16. A method as defined in claim 15, wherein said separated caustic solution is allowed to stand so as to cause settling of ligneous matter therefrom, and the settled ligneous matter is recovered.

17. A method as defined in claim 7, wherein said digestion of vegetable material in said retorts is carried out for at least a period of about three hours, and the polarity of said terminals is reversed at intervals of about one hour.

References Cited

UNITED STATES PATENTS 3,342,805   9/1967   Callihan _____ 260—232

DONALD E. CZAJA, Primary Examiner

M. I. MARQUIS, Assistant Examiner

U.S. Cl. X.R.

23—290.5; 127—35, 36, 37; 260—124